(12) United States Patent
Hirai et al.

(10) Patent No.: US 8,411,141 B2
(45) Date of Patent: Apr. 2, 2013

(54) VIDEO PROCESSING METHOD FOR REDUCING THE LOAD OF VIEWING

(75) Inventors: Seiichi Hirai, Kodaira (JP); Naoki Hashiguchi, Kodaira (JP); Tomomi Takada, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 965 days.

(21) Appl. No.: 12/213,070

(22) Filed: Jun. 13, 2008

(65) Prior Publication Data

US 2009/0015718 A1   Jan. 15, 2009

(30) Foreign Application Priority Data

Jul. 11, 2007   (JP) ................... 2007-182017

(51) Int. Cl.
*H04N 7/18*   (2006.01)
*H04N 7/12*   (2006.01)
*H04N 11/02*   (2006.01)
*H04N 11/04*   (2006.01)
*H04B 1/66*   (2006.01)

(52) U.S. Cl. .................. 348/143; 375/240.08

(58) Field of Classification Search .......... None
See application file for complete search history.

(56) References Cited

U.S. PATENT DOCUMENTS

| | | | | |
|---|---|---|---|---|
| 5,479,264 A | * | 12/1995 | Ueda et al. | 386/317 |
| 5,896,176 A | * | 4/1999 | Das et al. | 375/240.15 |
| 6,057,893 A | * | 5/2000 | Kojima et al. | 348/700 |
| 7,844,167 B1 | * | 11/2010 | McDade et al. | 386/357 |
| 7,929,608 B2 | * | 4/2011 | Krishnan | 375/240.13 |
| 7,940,986 B2 | * | 5/2011 | Mekenkamp et al. | 382/181 |
| 2006/0074893 A1 | * | 4/2006 | Snijder et al. | 707/4 |
| 2006/0143667 A1 | * | 6/2006 | Kurosawa | 725/89 |
| 2006/0251330 A1 | * | 11/2006 | Toth et al. | 382/236 |
| 2007/0071282 A1 | * | 3/2007 | Isogai | 382/100 |
| 2007/0076801 A1 | * | 4/2007 | Lim et al. | 375/240.25 |
| 2007/0083883 A1 | * | 4/2007 | Deng | 725/19 |
| 2007/0177807 A1 | * | 8/2007 | Enomoto | 382/224 |
| 2008/0021879 A1 | * | 1/2008 | Cheng | 707/3 |

* cited by examiner

*Primary Examiner* — Joseph Ustaris
*Assistant Examiner* — Edemio Navas, Jr.
(74) *Attorney, Agent, or Firm* — Wenderoth, Lind & Ponack, L.L.P.

(57) ABSTRACT

A video processing apparatus obtains information describing the amount of displacement of images in multiple predetermined units (such as video durations) imaged by an imaging apparatus from an image at steady state, which is a reference, and displays the images in the multiple predetermined units in decreasing order of amounts of displacement based on the obtained information describing the amounts of displacement.

6 Claims, 16 Drawing Sheets

| Row number | Average degree of dissimilarity | First ID | Last ID |
|---|---|---|---|
| 1 | 0.95 | 101 | 320 |
| 2 | 0.38 | 321 | 785 |
| 3 | 0.92 | 786 | 1389 |
| ⋮ | ⋮ | ⋮ | ⋮ |
| p | 0.31 | 9221 | 9873 |

VIDEO PROCESSING METHOD FOR REDUCING THE LOAD OF VIEWING

BACKGROUND OF THE INVENTION

1. Field of the Invention

The present invention relates to a video processing method and, in particular, it relates to a video processing method that can reduce the load of viewing on a viewer even in a case where all recorded images must be viewed since the presence of the occurrence of an event is not clear.

2. Description of the Related Art

Conventionally, a video surveillance system is deployed in public facilities such as a hotel, a building, a convenience store, a financial institution, a dam and a road for the purpose of the suppression of crimes and/or the prevention of accidents. Such a video surveillance system photographs a subject under surveillance with an imaging apparatus such as a camera and transmits the images to a surveillance center such as a management office and a security room. A surveillance person may monitor the images and be alert on and/or record or save the image or images for the purpose or as required.

In many cases, a recent video surveillance system may use a random access medium typically such as a hard disk drive (HDD) as a recording medium for images, instead of a conventional video tape medium.

FIG. 16 shows a configuration example of the video surveillance system including a recording apparatus having an HDD as a recording medium.

The video surveillance system includes a recording apparatus 301, which is an apparatus generally called digital video recorder, a camera 302, and a monitor 303 having a display unit 321.

The recording apparatus 301 includes a digital converting section 311, an analog converting section 312, compressing section 313, a decompressing section 314, a recording unit 315, an operating unit 316 and a control section 317.

The camera 302 analog-outputs an imaged image as an electric signal.

The monitor 303 displays an input analog image on the display unit 321.

In the recording apparatus 301, an analog image input from the camera 302 is converted to a digital signal by the digital converting section 311. The digital signal undergoes data compression processing by the compressing section 313 and is recorded on the HDD by the recording unit 315. A user operation is detected by the operating unit 316, and, in response thereto, the subject image is loaded from the HDD by the recording unit 315, undergoes data decompression processing by the decompressing section 314, is converted to an analog signal by the analog converting section 312 and is output to the monitor 303. The processing in those steps is controlled by the control section 317.

Here, the control section 317 further includes a CPU (Central Processing Unit). The operating unit 316 may be a generic computer operating device such as a mouse and a keyboard or may be a special control panel having buttons.

FIG. 17 shows another configuration example of the video surveillance system including a recording apparatus having an HDD as a recording medium.

The video surveillance system in this example has a recording apparatus 331, which is an apparatus generally called network digital recorder, a network camera 332 and a surveillance terminal 333.

The recording apparatus 331 includes a network unit 341, a recording unit 342 and a control section 343.

The surveillance terminal 333 includes a network unit 351, a decompressing section 352, a display unit 353, an operating unit 354 and a control section 355.

The network camera 332 converts an imaged image to a digital signal, performs data compression processing thereon and digitally outputs the result over an IP (Internet Protocol) network.

In the recording apparatus 331, a digital image input from the network camera 332 to the network unit 341 is recorded on the HDD by the recording unit 342. A request from the surveillance terminal 333 is received by the network unit 341, and, in response thereto, the subject image is loaded from the HDD by the recording unit 342 and is output through the network unit 341. The processing in the steps above is controlled by the control section 343.

Here, the control section 343 further includes a CPU.

In the surveillance terminal 333, data decompression processing is performed on a digital image input by the network unit 351 by the decompressing section 352, and the result is displayed on the terminal screen by the display unit 353. The operating unit 354 detects a user operation and, in response thereto, transmits a necessary request to the recording unit 331 through the network unit 351. The processing in the steps above is controlled by the control section 355.

Here, the control section 355 further includes a CPU. The operating unit 354 may be a generic computer operating device such as a mouse and a keyboard in many cases. The display unit 353 may be a generic computer display device such as a CRT (Cathode-Ray Tube) and an LCD (Liquid Crystal Display) in many cases.

FIG. 18 shows an example of the operation screen of the surveillance terminal 333 (that is, details displayed on the display unit 353 of the surveillance terminal 333) in a case where the recording apparatus 331 having an HDD as a recording medium is used as described above.

Having described the screen example in a case where the recording apparatus 331 shown in FIG. 17 is used above, the screen has an identical function available to a user to that of the screen in a case where the recording apparatus 301 shown in FIG. 16 is used. Furthermore, there is virtually not a difference between them except for slight differences in display formats and operation specifications due to the difference in types of devices used in the operating units and/or the display unit. For those reasons, the case using the recording apparatus 331 will be described as an example here.

A video display unit 361 is an area displaying an image.

In a playback button group 362, unique playback types are respectively assigned to buttons. In order to give a new playback instruction for an image being displayed on the video display unit 361, the playback type button corresponding to the instruction is to be pressed.

In a camera switching button group 363, cameras subject to recording are respectively assigned to buttons, each of which is to be pressed to switch the recorded image displayed on the video display unit 361 to a recorded image by another camera. This function is generally called camera search.

A date-and-time search button group 364 allows specification (or input or selection) of an arbitrary time. By specifying a time and pressing a search button, the image at the specified time of the currently selected camera is displayed on the video display unit 361. This function is generally called date-and-time search.

An alarm recording list display section 365 displays a list of recorded contents by alarm recording by the currently selected camera for each recording event.

Here, the term "alarm recording" refers to a recording type that records irregularly, that is, every time when a recording event occurs and is paired with normal recording that records at all times or periodically according to a predetermined schedule. Various recording events may occur and may include signal input from an external sensor to a contact terminal provided on a camera or a recording apparatus, trigger based on an image recognition processing result and press of an emergency recording button by a surveillance person.

Each row of the list of alarm recording may display the time of occurrence of a recording event (such as a starting time and an ending time), a type of recording event and/or a reduced image of the beginning image by a recording event, for example. Each of the rows can be selected, and the image of the selected recording event is displayed on the video display unit 361. This function is generally called alarm search.

A function generally called marking search, not shown in FIG. 18, may be also available, which is a function similar to the alarm search. While the alarm recording performs recording for each recording event, the marking recording only performs marking on a recorded image upon occurrence of a recording event. The marking search displays a list of the markings, and the screens and operations may be similar to those of the alarm recording list display section 365.

Next, the playback of images will be described.

FIG. 19 shows a state of the playback of video frames.

More specifically, the horizontal axis is a time axis 372, and the left side is older in time, and the right side is newer in time. A series of images are shown, and one frame 371 of images of a part of the series of images is shown.

Conventionally, the playback at a standard speed in the forward direction may be processing of displaying each one frame from the left to right of the time axis 372 sequentially at predetermined time intervals.

Next, the degree of similarity of images (videos) will be described.

Technologies having significantly developed in recent years with the increase in speed of computers may include image recognition technologies. The image recognition technologies may include a technology of calculating the degree of similarity.

The term "degree of similarity" refers to an indicator for evaluating the similarity between two images, and the expression "the degree of similarity is high" refers to the state that two images are similar. The degree of similarity is calculated based on the feature amounts of images to be compared. The feature amount of an image to be used may be a feature amount based on the color distribution or intensity gradient distribution in the spatial direction and may be selected according to the purpose, that is, according to the type of similarity, such as the similarity in color and similarity in composition, to be obtained.

For example, Non-Patent Document 1 discloses a method of calculating the degree of dissimilarity (that is, the inverted indicator of the degree of similarity) from the feature amounts of images.

More specifically, the similarity between images is defined based on the squares distance between feature amount vectors, and the degree of dissimilarity D (X,Y) of two images X and Y in a case where Nf types of image feature amount are defined is obtained by:

$$D(X, Y) = \sum_{i}^{Nf} wi |xi - yi|^2 \quad \text{[EQ 1]}$$

where xi and yi are feature amount vectors of X and Y, respectively, and wi is a weight for the feature amount. The feature amount may be a feature amount based on a color distribution or a feature amount based on an intensity gradient distribution, for example.

Having described the degree of dissimilarity, the result of the subtraction of a degree of dissimilarity from a predetermined value or the inverse value of the degree of dissimilarity may be used, for example. In other words, a high degree of dissimilarity is equivalent to a low degree of similarity, and a low degree of dissimilarity is equivalent to a high degree of similarity.

Patent Document 1: JP-A-7-254091
Non-Patent Document 1: Hiroike and Musha, "Daikibo na Gazou Shugo notameno Hyougen Moderu (Representation Model for Large Image Set)", SPSTJ Journal No. 1, Volume 66, 2003, p. 93 to 101.

A recording apparatus having a random access medium typically such as an HDD as described above is highly convenient to have a characteristic that an image can be output instantly in accessing a target image, unlike a video tape medium requiring to wait for the completion of an operation such as fast forwarding or rewinding.

However, the convenience is exhibited in a case where the place and/or date and time of occurrence of an event is/are known and the camera and date and time can be specified by using the camera search and date-and-time search. On the other hand, in a case where the presence of occurrence of an event is not clear or a case where the presence of occurrence of an event is to be found, the search functions may not be used, and all of recorded images must be basically played and viewed.

Against the problem, the alarm search and the marking search are greatly effective functions for displaying a list of delimiters to an occurring event in a series of images. The information for the delimiters may be based on the input from an external sensor or a processing result of image recognition processing on an input image. However, those kinds of information may be limited under various conditions including bad conditions such as wind, rain and/or snow and backlighting in image recognition processing and may not have 100% reliability in reality. In a case requiring reliability, all of recorded images must be still played and viewed.

A required time is a problem here in playing and viewing all recorded images. One method for saving time is a method of viewing by fast forwarding and playing. However, in this method, an image part having an event to be watched passes by instantly. Therefore, in order not to miss the image part, a viewer is forced to be highly strained for a long period of time. Conversely, it might be a factor responsible for missing an event to be watched.

In recent years, the capacities of HDDs have been increased, and the amount (or time length) of recorded images has been dramatically increased. Those tendencies will be further strengthened.

The invention was made in view of those matters in the past, and it is an object of the invention to provide a video processing method that can reduce the load of viewing on a viewer even in a case where the presence of occurrence of an event is not clear and all of recorded images must be viewed.

SUMMARY OF THE INVENTION

In order to achieve the object, the invention is configured in a video processing method that processes an image, which is imaged by an imaging apparatus, by a video processing apparatus as follows.

That is, the video processing apparatus obtains information describing an amount of displacement of images in multiple predetermined units, which are imaged by the imaging apparatus, from an image at a steady state, which is a reference, and displays the images in the multiple predetermined units in decreasing order of amount of displacement based on the obtained information describing the amount of displacement.

Thus, since images are displayed in decreasing order of amount of displacement from that at the steady state, the load of viewing on a viewer can be reduced even in a case where the presence of occurrence of an event is not clear and all recorded images must be viewed, for example.

In this case, the video processing apparatus may be any one of those in various configurations. For example, the video processing apparatus may be one apparatus or may include multiple apparatus that are responsible for multiple processes according to the invention.

For example, in the example in FIG. 5, the imaging apparatus is a network camera 202, and the video processing apparatus includes a recording apparatus 201 and a surveillance terminal 203.

The image at a steady state functioning as a reference may vary and may be an image at a state with no problems, for example. Alternatively, multiple images at a steady state may be switched based on the time period.

The predetermined unit of images may vary and may be a unit of one frame or a unit of a set of two or more frames, for example.

The amount of displacement is an amount of a change (or a difference) and may be similar to a degree of dissimilarity, which is the opposite indicator of the degree of similarity. For that reason, the use of information describing the degree of dissimilarity, information describing the degree of similarity and other term having a similar characteristic, instead of the information describing an amount of displacement, are virtually the same and are included in the invention.

The amount of displacement (or the degree of dissimilarity) may be obtained in any manner, for example, and the amount describing how much different one or more feature amounts of videos (images) are may be used, for example. The degree of similarity may be an amount describing how much similar one or more feature amounts of videos (images) are.

The information describing the amount of displacement may be information of the average value of the amounts of displacements of multiple video frames, for example.

The form for displaying images in multiple predetermined units in decreasing order of amount of displacement may vary and may be a form in which all images in multiple predetermined units are displayed or a form in which a part of images in multiple predetermined units are only displayed in decreasing order of amount of displacement.

Alternatively, instead of the form in which images in multiple predetermined units are displayed (played), a form is also applicable in which a list of marks (such as predetermined forms and characters describing names) describing images in multiple predetermined units is displayed in decreasing-order of amount of displacement.

A configuration example of the video processing apparatus according to the invention is as follows.

That is, images in a video duration having multiple video frames may be used as images in the predetermined unit.

Thus, since the video duration, which is a set of multiple video frames, is a unit of images, a viewer can view them more easily than the case where images in frames are used as the images in the predetermined unit.

Another configuration example of the video processing method according to the invention is as follows.

That is, the video processing apparatus obtains information describing a feature amount of the image at a steady state, obtains information describing a feature amount of a video frame, which is imaged by the imaging apparatus, obtains information describing an amount of displacement therebetween based on the information describing the feature amount of the video frame and the feature amount of the image at the steady state, delimits the video duration and determines the length of the video duration based on changes in the amount of displacement of the video frames in chronological order, obtains the information describing the average of the amounts of displacement of the video frames included in each video duration as information describing the amount of displacement of the video duration, and records the information describing the amount of displacement of the obtained video duration and images of the video duration correspondingly in recording means.

Thus, since the video duration is delimited based on the change in amount of displacement of a video frame in chronological order, the video duration can be delimited for each set of video frames having closer amounts of displacement. Furthermore, the information describing the amount of displacement of each video duration and images of the video duration are recorded correspondingly, which is useful for processing of playing or searching based on the amount of displacement.

In this case, the information describing the feature amount of an image at a steady state may be an average value among multiple video frames.

The feature amount may be one kind of feature amount or one in consideration of multiple kinds of feature amount, for example.

The form for delimiting the video duration based on the change in amount of displacement of video frames in chronological order may be a form in which the current video frame is included in the next video duration in a case where the difference between the average value of the amounts of displacement of video frames after the beginning delimiting position of one video duration and the amount of displacement of the current video frame is equal to or higher than a predetermined threshold value (or exceeds a predetermined threshold value). Another alternative form may be used in which a video duration is delimited between prior and subsequent video frames in chronological order in a case where the difference between the amounts of displacement between the two video frames is equal to or higher than a predetermined threshold value (or exceeds a predetermined threshold value).

In a case where the information describing the average of the amounts of displacement of video frames included in each video duration is obtained and is used by the processing of delimiting a video duration, the subsequent processing may use the information.

The form for recording the information describing the amount of displacement of each video duration and images of the video duration correspondingly may be a form in which the information (first ID) identifying the first video frame of each video duration and information (last ID) identifying the last video frame and the information describing the amount of displacement of the video duration are recorded correspondingly, and video data of each video frame and the information (ID) identifying the video frame are recorded correspondingly.

As described above, the video processing method according to the invention can reduce the load of viewing on a viewer even in a case where the presence of occurrence of an event is not clear and all recorded images must be viewed, for example, since images are displayed in decreasing order of amount of displacement from one at a steady state.

DESCRIPTION OF THE INVENTION

With reference to drawings, embodiments according to the invention will be described.

First Embodiment

First of all, an outline of the playback of this embodiment will be described.

Figure 1:
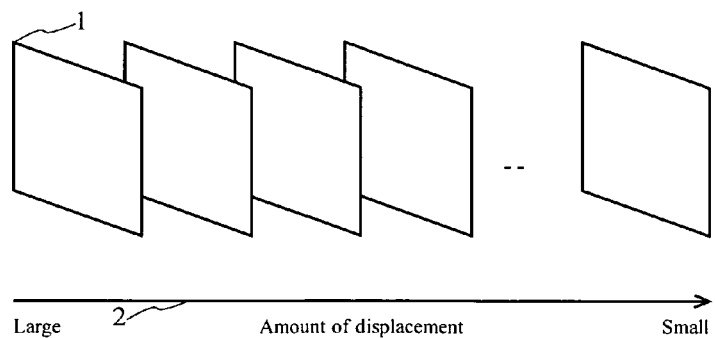
FIG. 1 is a diagram showing an example of the playback of video frames according to an embodiment of the invention.

FIG. 1 shows an example of how images are played.

More specifically, the horizontal axis is an amount-of-displacement axis 2 with reference to a steady image. The left side shows the maximum amount of displacement, and the right side shows the minimum amount of displacement. A series of images is shown, and one frame (video frame 1) of images is illustrated as a part of the series of images.

The playback of this embodiment is processing of displaying each one frame sequentially at predetermined time intervals from the left to the right of the amount-of-displacement axis 2 in FIG. 1.

Here, in this embodiment, the amount of displacement is the opposite indicator of the degree of similarity and can be said as the degree of dissimilarity. In other words, according to this embodiment, images are played in order from the most similar one to the least similar one.

Figure 19:
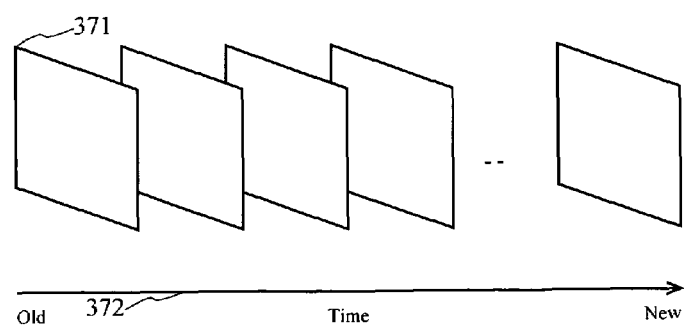
FIG. 19 is a diagram showing an example of the playback of video frames.

For easy description, FIG. 1 illustrates one frame as a unit in order to clarify the difference from FIG. 19 according to a conventional example.

However, in a case where the unit of alignment is one frame, a frame having a completely different pattern from and not correlated to an adjacent frame may be played, which may result in the playback of a meaningless image to a surveillance person. For that reason, the unit of images desirably includes multiple frames, which are serial in time, in reality.

Figure 2:
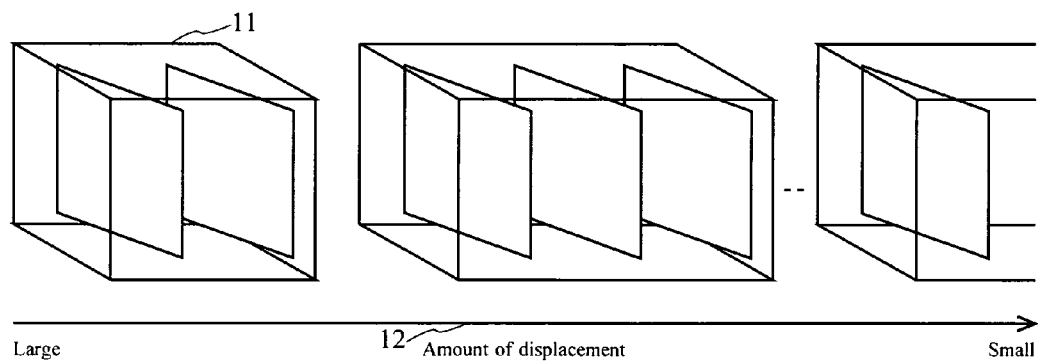
FIG. 2 is a diagram showing an example of the playback of video durations according to an embodiment of the invention.

FIG. 2 shows an example how images are played in video durations.

More specifically, the horizontal axis is an amount-of-displacement axis 12, and multiple frames, which are serial in time, are expressed in a rectangular parallelepiped as a video duration 11.

Here, the time length of the video duration 11 has a proper value depending on the type of images to be handled. For example, a point where the amount of displacement changes largely may be detected dynamically, and the time length may be desirably a variable value, which is determined based on the point of change. However, the time length may be a preset fixed value in some cases.

In other words, each video duration may be a duration from the first frame to the last frame in a range between two points of change by detecting the occurrence of change by using a threshold value, for example. Alternatively, each video duration may have a fixed length from the first frame upon occurrence of change, which may be determined by using a threshold value, for example.

Next, with reference to FIGS. 3 and 4, how to obtain the amount of displacement will be described.

Figure 3:
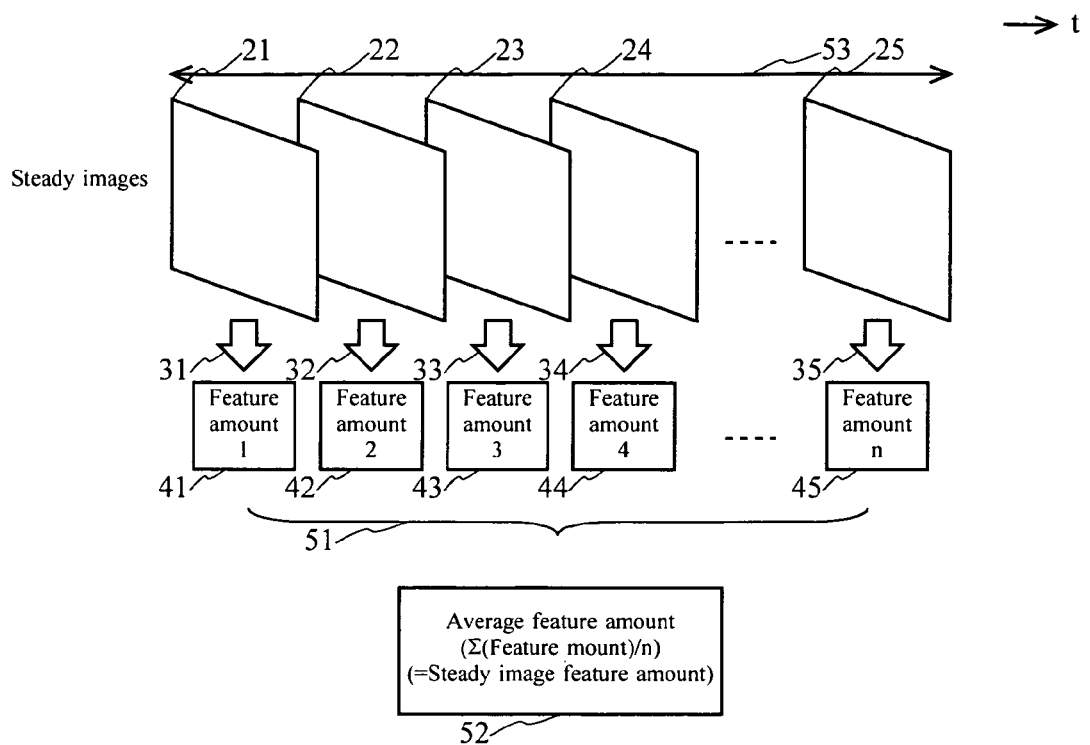
FIG. 3 is a diagram showing an example of how to obtain feature amounts according to an embodiment of the invention.

With reference to FIG. 3, how to obtain a feature amount of an image will be described.

First of all, a steady image will be considered. The steady image may be an image without any abnormality, which is kept in advance, and functions as a reference for obtaining an amount of displacement.

The steady image may be kept once at the beginning or may be kept several times such as during the daytime, in the evening and at night, which may be switched according to the time period.

In FIG. 3, the horizontal axis indicates a time t. FIG. 3 further shows multiple frames 21 to 25 contained in steady images. The alignment of the multiple frames 21 to 25 illustrates the chronological order from the left to the right.

Feature amounts (vectors) 41 to 45 of the frames 21 to 25 are obtained by feature amount extracting processes 31 to 35 on the frames 21 to 25. The average feature amount (steady image feature amount vector) 52 is obtained by performing averaging processing 51 on the multiple feature amounts 41 to 45.

FIG. 3 shows a time length 53 of steady images, and the abbreviation notation " . . . " is used for repetitive parts.

In this embodiment, the technology of calculating a degree of similarity is used for calculating an amount of displacement. The subjects for obtaining the degree of dissimilarity are a steady image and an input frame.

The calculation of a degree of dissimilarity requires the extraction of an image feature amount from each image.

The feature amount extraction processes 31 to 35 with reference to a steady image are performed on all frames contained in steady images or several frames sampled therefrom. The averaging processing 51 is performed on the feature amounts 41 to 45 of the extracted frames, and the feature amount (average feature amount) 52 of the steady image is obtained.

The length 53 of the steady images may be an arbitrary length according to the purpose. For example, indoor images have fewer changes in sunshine and may have fewer variations. Therefore, the steady images may be shorter. Outdoor images must contain images for a longer period of time. Conversely, the degree of dissimilarity (similarity) of outdoor images may be obtained by switching the steady images according to the time period. In this case, the length of the steady images may be shorter.

Figure 4:
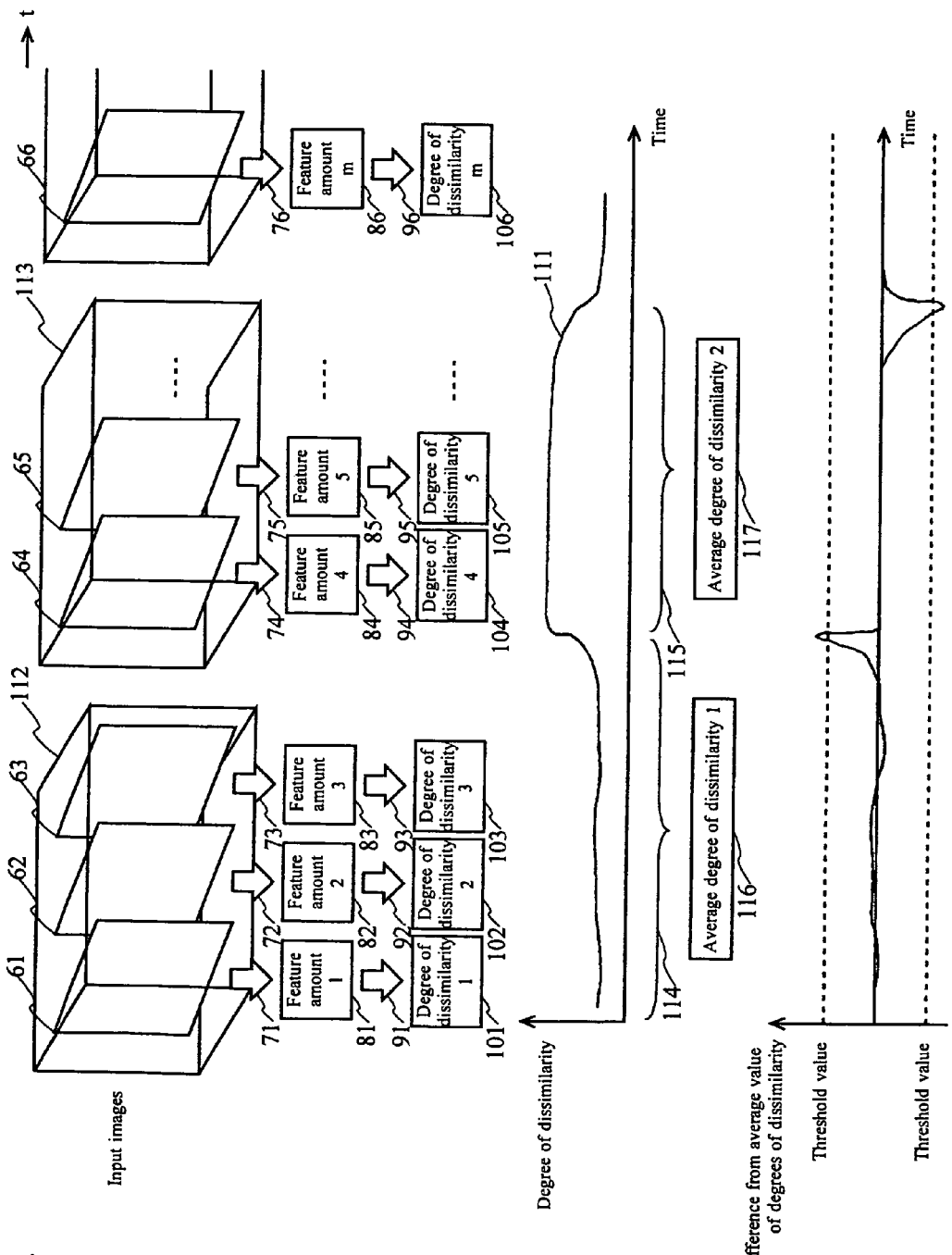
FIG. 4 is a diagram showing an example of how to obtain the degree of dissimilarity according to an embodiment of the invention.

With reference to FIG. 4, how to obtain the degree of dissimilarity (amount of displacement) will be described.

The horizontal axis indicates a time t, and FIG. 4 shows multiple input frames 61 to 66 during the operation of video surveillance. The alignment of the multiple input frames 61 to 66 illustrates the chronological order from the left to the right.

The feature amounts 81 to 86 of the frames 61 to 66 can be obtained by feature-amount extraction processes 71 to 76 on the input frames 61 to 66.

The degrees of dissimilarity between the feature amounts 81 to 86 of the input frames 61 to 66 and the steady image feature amount 52 are calculated by degree-of-dissimilarity calculating processes 91 to 96 on the feature amounts 81 to 86 of the input frames 61 to 66 and the steady image feature amount 52. Thus, the degrees of dissimilarity 101 to 106 between the input frames 61 to 66 and the steady images can be obtained.

FIG. 4 shows a curve 111, which is a plot of the obtained degrees of dissimilarity 101 to 106 where the horizontal axis is a time, and the vertical axis is the degree of dissimilarity. On the curve 111 of the graph, the point where the degree of dissimilarity changes from a lower part to a higher part corresponds to the "point where the amount of displacement changes largely", and the video duration 112 determined by the point of change corresponds to the video duration 11 shown in FIG. 2. The same is true in the video duration 113 determined by the point where the degree of dissimilarity changes from a higher part to a lower part.

Based on the curve 111 of the graph, the average degree of dissimilarity 116 obtained by averaging the degrees of dissimilarity of frames contained in the video duration 112 by averaging processing 114 and the average degree of dissimilarity 117 obtained by averaging the degrees of dissimilarity of frames contained in the video duration 113 by averaging processing 115 are the degrees of dissimilarity (amounts of displacement) from the steady images.

The method that plays video durations in decreasing or increasing order of the thus obtained average degrees of dissimilarity is the playback method shown in FIG. 2.

Here, having described that a video duration can be created by delimiting multiple input frames at a position where the change in degree of dissimilarity or similarity is large from steady images according to this embodiment, the method for delimiting a video duration may vary.

For example, as shown in FIG. 4, a method is applicable in which a video duration may be delimited at a position where the difference between the average value of the histories of the degree of dissimilarity from the previous delimiting position and the degree of dissimilarity of the current frame exceeds a predetermined threshold value.

In another example, a method is applicable in which a video duration may be delimited at a position where the difference between the degrees of dissimilarity between adjacent frames exceeds a predetermined threshold value.

Figure 5:
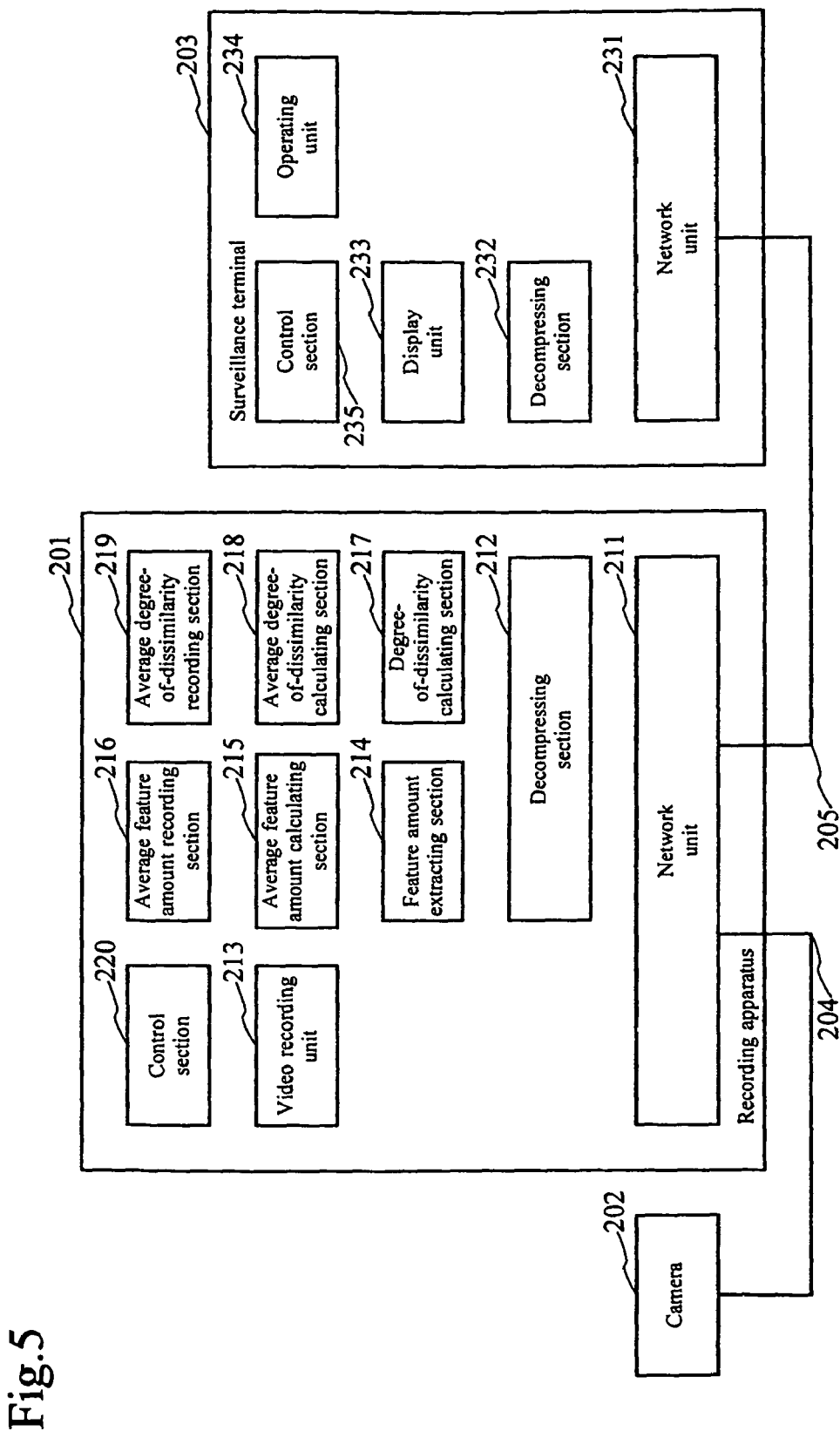
FIG. 5 is a diagram showing a configuration example of a video surveillance system according to an embodiment of the invention.

FIG. 5 shows a configuration example of the video surveillance system according to an embodiment of the invention.

The video surveillance system of this embodiment includes a recording apparatus 201, which has a distinctive function according to the invention in particular, a network camera 202, a surveillance terminal 203 and network media 204 and 205.

Here, the network camera 202 and the recording apparatus 201 are connected over the network medium 204, and the recording apparatus 201 and the surveillance terminal 203 are connected over the network medium 205.

The recording apparatus 201 is a storage/distribution apparatus including a network unit 211, a decompressing section 212, a video recording unit 213, a feature-amount extracting section 214, an average feature-amount calculating section 215, an average feature-amount recording section 216, a degree-of-dissimilarity calculating section 217, an average degree-of-dissimilarity calculating section 218, an average degree-of-dissimilarity recording section 219 and a control section 220.

The surveillance terminal 203 is a terminal apparatus including a network unit 231, a decompressing section 232, a display unit 233, an operating unit 234 and a control section 235 and may be a personal computer (PC) connecting to a CRT or a liquid crystal monitor, for example.

Each of the network media 204 and 205 may be a network cable, a line of a wireless LAN (Local Area Network) or a public line and is responsible for transmission of transmit data. Each of the network media 204 and 205 may include network equipment such as a router, a switch and a hub.

According to this embodiment, the network camera 202, the recording apparatus 201 and the surveillance terminal 203 are connected over the network media 204 and 205, and the connected apparatus and devices can be mutually communicated.

The network camera 202 may be an imaging apparatus including an imaging unit that images (photographs) an image, a compressing section that digitizes an imaged image and, in some cases, may perform compressing processing thereon, and a network unit. The network camera 202 has a function of converting an imaged surveillance image to a form suitable for the network transmission and transmitting the result to the network medium 204. Having described the camera-integrated apparatus as an example of this embodiment, a network encoder type apparatus with an isolated imaging unit outside of the apparatus is also applicable in another configuration example.

The recording apparatus 201 has a function of receiving an image transmitted from the network camera 202 over the network medium 204 and recording the image on a recording medium connected thereto and a function of retrieving a requested image from a recording medium according to a video distribution request from the surveillance terminal 203 and distributing the image to the surveillance terminal 203 over the network medium 205. Processing within the apparatus is controlled by the control section 220, and the control section 220 also includes a CPU. The recording medium subject to the recording by the recording unit may be a fast and random accessible recording medium typically such as an HDD, an optical disk drive and a semiconductor disk drive.

The surveillance terminal 203 has a function of receiving a live image imaged by the network camera 202 or a recorded image by the recording apparatus 201 and converting and outputting the image into a displayable form onto the display unit 233. In a case where the monitor is an analog monitor, the surveillance terminal 203 performs analog conversion. In a case where the received image is a compressed image, the surveillance terminal 203 performs decompressing processing thereon by using the decompressing section 232. Processing within the apparatus is controlled by the control section 235, and the control section 235 also includes a CPU. The operating unit 234 may be a generic computer operating device such as a mouse and a keyboard according to this embodiment but may be a special control panel having a button group in some cases. The display unit 233 may be a generic computer display device such as a CRT and an LCD according to this embodiment but may be a special display monitor such as a touch panel in some cases.

Here, having described one recording apparatus 201, one network camera 202 and one surveillance terminal 203 for simple description according to this embodiment, multiple of them may be connected to the network media 204 and 205.

Having described a so-called network digital recorder, for example, as the recording apparatus 201 of this embodiment, a recording apparatus such as a so-called digital video recorder that inputs an analog image from a camera is applicable in another configuration example. In this case, the network unit 211 may function as a digital converting section or an analog converting section, and the network media 204 and 205 are analog signal lines.

Next, an example of the flow of processing to be performed in the video surveillance system according to this embodiment will be described.

Figure 6:
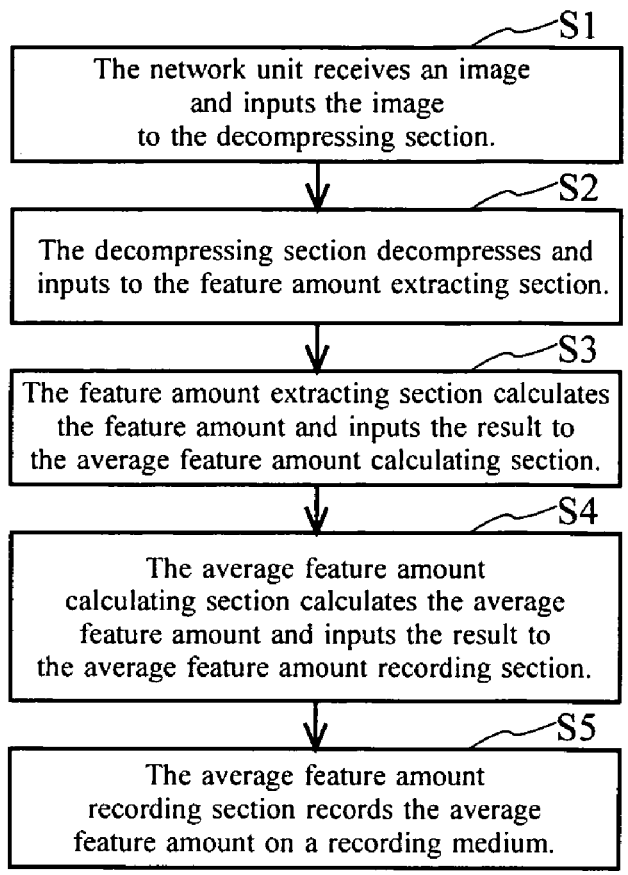
FIG. 6 is a diagram showing an example of the flow of the processing in a recording apparatus for obtaining the average feature amount of steady images according to an embodiment of the invention.

FIG. 6 shows an example of the flow of processing in the recording apparatus 201 for obtaining the average feature amount of steady images.

First of all, the network unit 211 receives a digital image input from the network camera 202 and inputs the digital image to the decompressing section 212 (step S1). The decompressing section 212 performs data decompressing processing on the input image and inputs the result to the feature amount extracting section 214 (step S2). The feature amount extracting section 214 calculates the feature amount vector of the input image and inputs the calculated feature amount vector to the average feature amount calculating section 215 (step S3). The average feature amount calculating section 215 holds the cumulative value of the input feature amount vectors, calculates the average feature amount vector therefrom and inputs the calculated average feature amount vector to the average feature amount recording section 216 (step S4). The average feature amount recording section 216 records the input average feature amount vector on a recording medium (step S5).

Here, the processing of sampling an image subject to the feature amount extraction, starting the cumulating of feature amounts in the average feature amount calculating section 215 and calculating the average feature amount, for example, may be performed according to the instruction from the control section 220.

According to this embodiment, the processing shown in FIG. 6 is performed upon initial setting when the system is installed or when a user desires to update the average feature amount for some reason.

Figure 7:
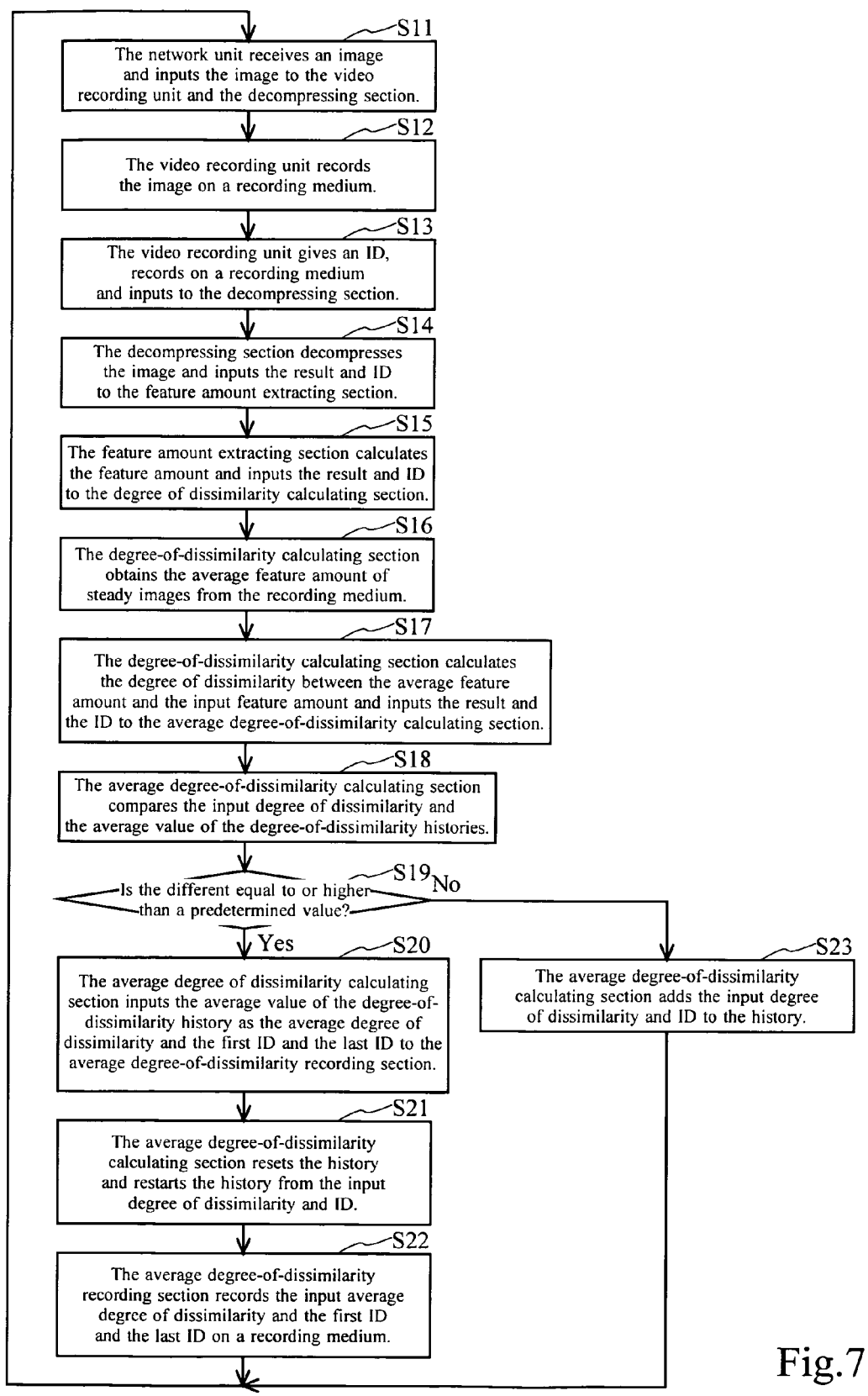
FIG. 7 is a diagram showing an example of the flow of processing in the recording apparatus for recording according to an embodiment of the invention.

FIG. 7 shows an example of the flow of processing in the recording apparatus 201 for recording a surveillance image.

First of all, the network unit 211 receives a digital image input from the network camera 202 and inputs the digital image to the video recording unit 213 and the decompressing section 212 (step S11). The video recording unit 213 records the input image on a recording medium (step S12). In this case, a unique ID is given to the image to be recorded before recording. The ID is further input to the decompressing section 212 (step S13).

The unit of images to which an ID is given is not limited in particular, and a serial ID is given to each one frame.

The decompressing section 212 performs data decompressing processing on the input image and inputs the decompressed image and the ID to the feature amount extracting section 214 (step S14). The feature amount extracting section 214 calculates the feature amount vector of the input image and inputs the calculated feature amount vector and the ID to the degree-of-dissimilarity calculating section 217 (step S15). In a case where the image input from the network camera 202 is not fully processed to stable the average intensity, the calculated feature amount vector may be divided by the average intensity of the frame. The degree-of-dissimilarity calculating section 217 loads the average feature amount vector of steady images from the recording medium (step S16), calculates the degree of dissimilarity between the loaded average feature amount and the input feature amount vector and inputs the calculated degree of dissimilarity and the ID to the average degree-of-dissimilarity calculating section 218 (step S17). Here, the loaded average feature amount vector is the value recorded in step S5 in FIG. 6.

The average degree-of-dissimilarity calculating section 218 holds the histories of the input degree of dissimilarity and IDs and compares the difference between the average value of the histories of the degree of dissimilarity and the currently input degree of dissimilarity (step S18). More specifically, the average degree-of-dissimilarity calculating section 218 compares the heights between the difference and a predetermined value (threshold value) (step S19) and, if the different is higher than the predetermined value, inputs the average value of the histories of the degrees of dissimilarity to the average degree-of-dissimilarity recording section 219 as the average degree of dissimilarity. At that time, the average degree-of-dissimilarity calculating section 218 also inputs the ID at the beginning of the histories (first ID) and the ID upon reset (last ID) to the average degree-of-dissimilarity recording section 219 (step S20).

Here, the average value of the histories of the degrees of dissimilarity is the average value of degrees of dissimilarity from immediately after reset and is the average value of the degrees of dissimilarity in a video duration between the first ID and the last ID.

Then, the histories in the average degree-of-dissimilarity calculating section 218 are reset, and the history is restarted from the currently input degree of dissimilarity and ID (step S21). In other words, the currently input degree of dissimilarity and ID come first in the next history instead of the previous history.

The average degree-of-dissimilarity recording section 219 records the input average degree of dissimilarity and the first ID and the last ID on a recording medium (step S22). Then, the original processing (step S11) is performed again.

On the other hand, if the difference is lower than the predetermined value (step S19), the average degree-of-dissimilarity calculating section 218 adds the currently input degree of dissimilarity and ID to the history (step S23), and then the original processing (step S11) is performed again.

The predetermined value to be used in the comparison processing (step S19) may be set and stored in a memory of the recording apparatus 201 in advance, for example.

The processing in the steps above is performed according to instructions from the control section 220.

Figures 8, 9:
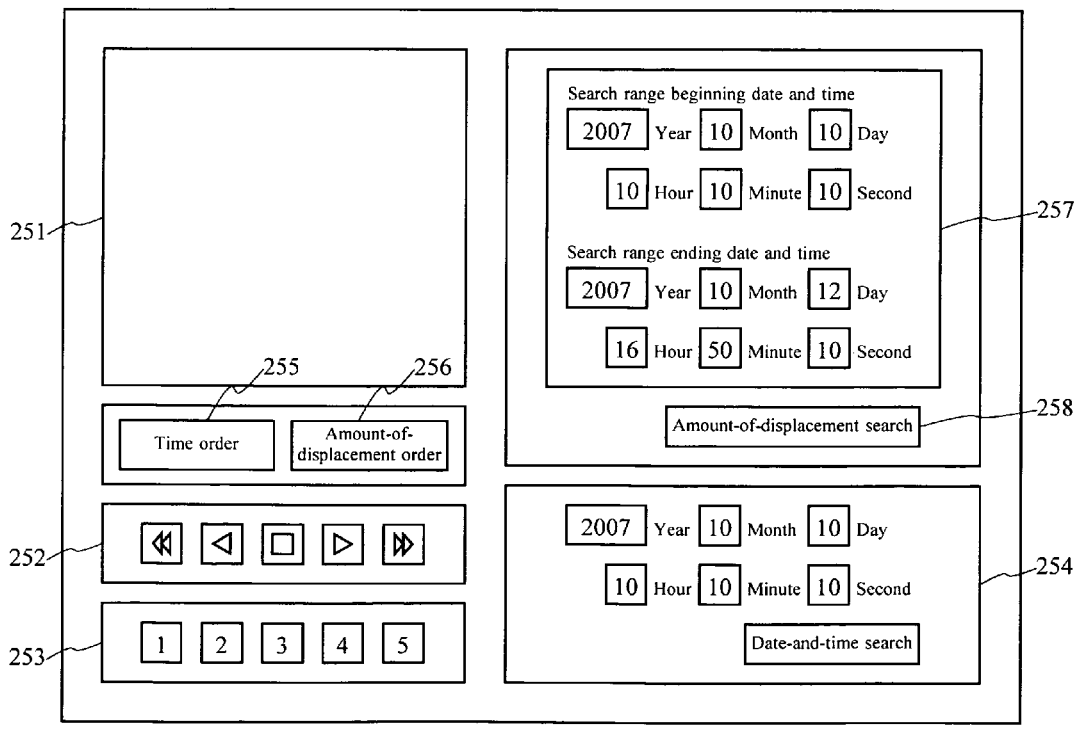
FIG. 8 is a diagram showing an example of the recording form of the average degree of dissimilarity and IDs according to an embodiment of the invention.
FIG. 9 is a diagram showing an example of the operation screen in a case where the recording apparatus according to an embodiment of the invention is used.

FIG. 8 shows an example of the recording form for the average degree of dissimilarity and the first ID and last ID in the average degree of dissimilarity recording section 219.

According to this embodiment, a recording format of a table 241 is used for each of multiple cameras. The table 241 for a certain camera (one camera) records a combination of the average degree of dissimilarity and the first ID and the last ID in relation with the row number where the row direction (the top-bottom direction in FIG. 8) is the chronological direction. The information on each row is information on each video duration.

The number of tables 241 to be prepared is equal to the number of cameras connecting to the recording apparatus 201.

For example, the table 241 may be configured to record the time of images with the first ID and/or the time of the image with the last ID in addition to the information above.

Next, the operation screen will be described.

FIG. 9 shows an example of the operation screen in a case where the recording apparatus 201 according to this embodiment is used. The operation screen is contents to be displayed on the display unit 233 of the surveillance terminal 203. An operation may be performed by a user (human) of the surveillance terminal 203 by using the operating unit 234 and may be pressing a button on the screen or entering a numerical value, for example, onto a field on the screen, for example.

A video display section 251 is an area displaying an image.

A playback button group 252 has buttons to which respective unique playback types are assigned. In order to give a new playback instruction to an image displayed on the video display section 251, the button of the playback type according to the instruction is to be pressed.

A camera switching button group 253 has buttons to which respective cameras subject to recording are assigned. One of the buttons is pressed to switch the recorded image displayed on the video display section 251 to a recorded image by a different camera. This function is generally called camera search.

A date-and-time search button group 254 allows the specification (or input or selection) of an arbitrary time. By specifying a time and pressing a search button, the image at the specified time by the currently selected camera is displayed on the video displaying section 251. This function is generally called date-and-time search.

Both of a time order playback mode button 255 and an amount-of-displacement order playback mode button 256 interlock to select one of them. The playback resulting from the operation on the playback button group 252 while selecting the time order playback mode button 255 is the playback in time order as shown in FIG. 19. The playback resulting from the operation on the playback button group 252 while selecting the amount-of-displacement order playback mode button 256 is the playback in order of amount of displacement (order of degree of dissimilarity) as shown in FIG. 2. The resulting playback image is displayed on the video display section 251.

A search range specifying field 257 allows input (or selection) of a time range to be searched.

An amount-of-displacement search execution button 258 if pressed displays a list of recorded images by the camera selected by the camera switching button group 253 in decreasing order of amount of displacement (degree of dissimilarity) in the time range input on the search range specifying field 257. According to this embodiment, this function is called amount-of-displacement search.

In another configuration example, a button for list narrowing may be provided for specifying the maximum number for the list display or a threshold value for amounts of displacement, for example.

Figure 10:
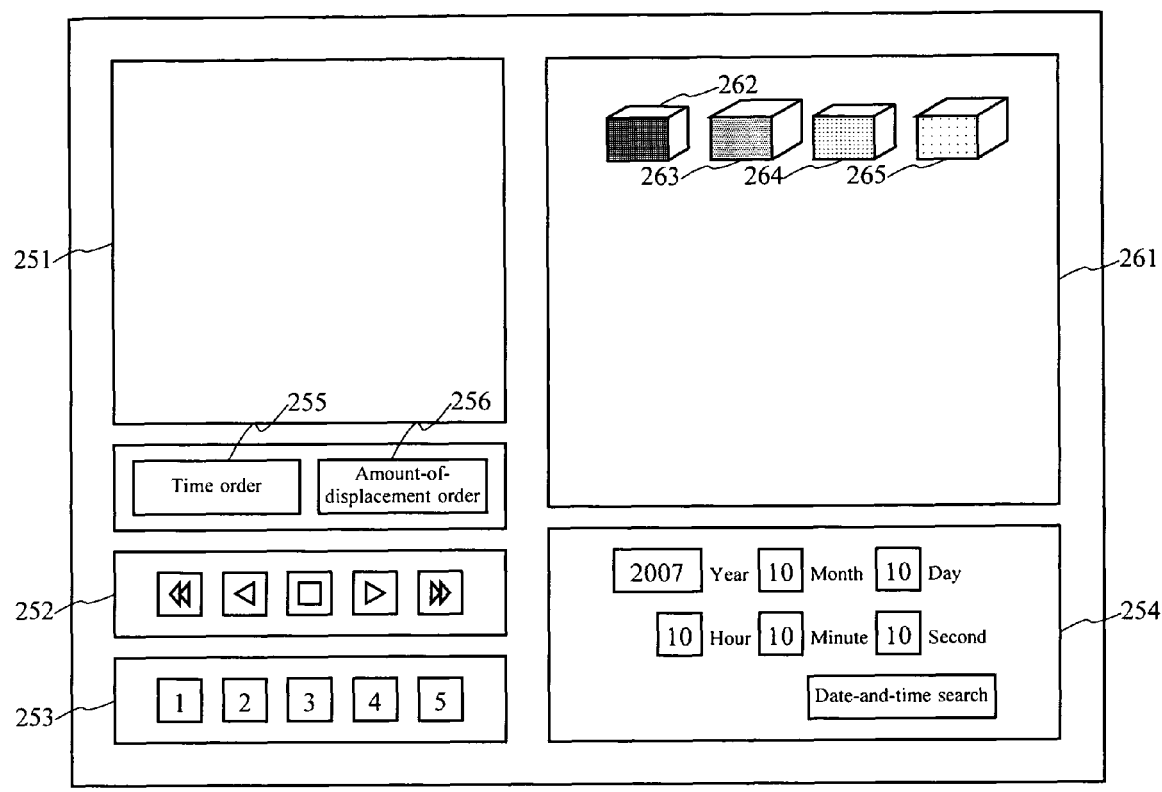
FIG. 10 is a diagram showing an example of the operation screen to be displayed as a result of the press of the amount-of-displacement search execution button according to an embodiment of the invention.

FIG. 10 shows an example of the operation screen to be displayed as a result of the press of the amount-of-displacement search execution button 258.

A search result list display field 261 displays a list of results of search processing and displays video durations 262 to 265 satisfying the search criteria as a result of search processing.

The search result list display field 261 of this embodiment displays the sizes of the amounts of displacement larger on the left side than the right side and larger on the upper part than the lower part (left>right and top>bottom). More specifically, in the example in FIG. 10, the video duration 262 on the left side most is a video duration having the largest amount of displacement, and the video duration 265 on the right side most is a video duration having the smallest amount of displacement.

The expressing form of this embodiment is only an example, and the expression in the reverse order may be used. Alternatively, both of them (the order of this embodiment and the opposite order) may be switched.

By selecting one of the video durations 262 to 265, images in the selected video duration are played and displayed on the video displaying section 251.

Figure 11:
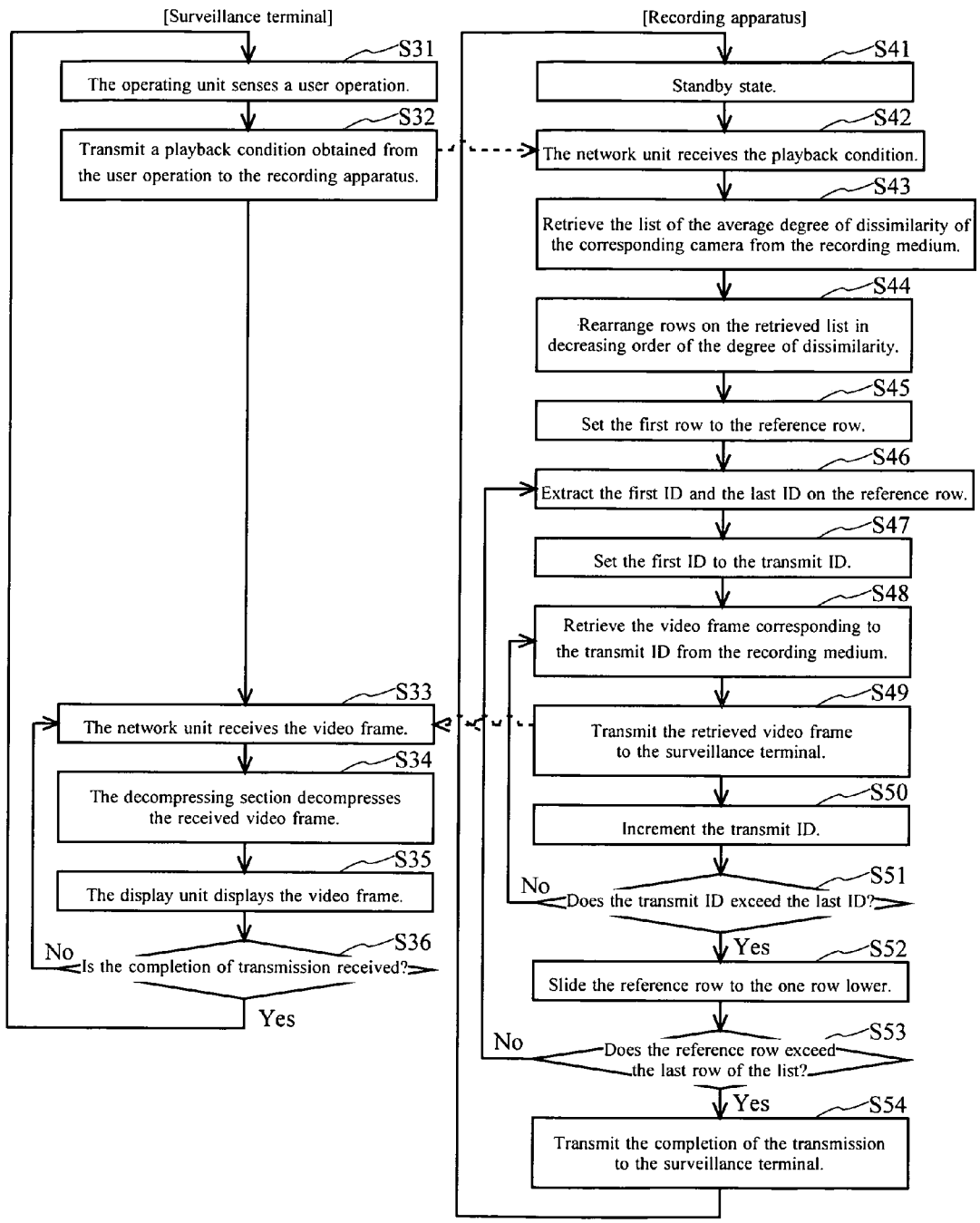
FIG. 11 is a diagram showing an example of the flow of processing in the recording apparatus and surveillance terminal for playing recorded images in an amount-of-displacement forward playback mode according to an embodiment of the invention.

FIG. 11 shows an example of the flow of processing in the recording apparatus 201 and surveillance terminal 203 for playing recorded images in an amount-of-displacement forward playback mode.

In a case where a user performs an operation on the surveillance terminal 203 in the amount-of-displacement forward playback mode and, for example, in a case where a normal playback button in the playback button group 252 is pressed on the operation screen shown in FIG. 9, the operating unit 234 senses the operation detail (step S31) and transmits a playback condition obtained from the operation detail to the recording apparatus 201 through the network unit 231 (step S32).

Here, in this embodiment, the playback condition is a set of the camera number being currently selected, the type of playback mode being currently selected and the pressed playback type (such as normal playback, forward and rewind).

The recording apparatus 201 at standby state (step S41) receives the playback condition through the network unit 211 (step S42) and retrieves the list of the average degree of dissimilarity of the corresponding camera from the recording medium through the average degree-of-dissimilarity recording section 219 (step S43). The information pieces (refer to FIG. 8) on the rows of the retrieved list are rearranged in decreasing order of the degree of dissimilarity (step S44), and the first row of the rearranged list are set to the reference row (step S45).

Next, the first ID and the last ID on the reference row are extracted (step S46). The value of the first ID is set to the ID (transmit ID) of the video frame to be transmitted (step S47), and the video frame corresponding to the transmit ID is retrieved from the recording medium through the video recording unit 213 (step S48). The retrieved video frame is transmitted to the surveillance terminal 203 through the network unit 211 (step S49), and the transmit ID is incremented (step S50).

The recording apparatus 201 repeats the processing in steps S48 to S50 until the transmit ID reaches the value of the last ID obtained in the processing in step S46. If the transmit ID exceeds the last ID (step S51), the reference row is moved by one until the reference row exceeds the last row on the second and subsequent rows of the list rearranged in the processing in step S44 (step S52), and the same processing is repeated thereon (steps S46 to S52).

Then, if the reference row exceeds the last row (step S53), the notification of the completion of the transmission is transmitted to the surveillance terminal 203 through the network unit 211 (step S54).

The surveillance terminal 203 receives the video frame transmitted from the recording apparatus 201 by the processing in step S49 through the network unit 231 (step S33), decompresses the received video frame by the decompressing section 232 (step S34) and displays the resulting video frame on the display unit 233 (step S35).

The routine (in steps S33 to S35) is performed at predetermined intervals until the notification of the completion of transmission is received from the recording apparatus 201 (step S36).

Those routines in both of the recording apparatus 201 and the surveillance terminal 203 are performed according to the instructions from the control sections 220 and 235 of the apparatus 201 and 203 or by the control sections 220 and 235.

In another configuration example, a part of the routine in steps S44 to S52 to be performed by the recording apparatus 201 in this embodiment may be implemented to perform by the surveillance terminal 203. For example, the list of average degrees of dissimilarity may be transmitted from the recording apparatus 201 to the surveillance terminal 203. The surveillance terminal 203 side may perform the processing in steps S44 to S47 and the processing in steps S50 to S52 and request the recording apparatus 201 side the video frame with the obtained transmit ID.

Figure 12:
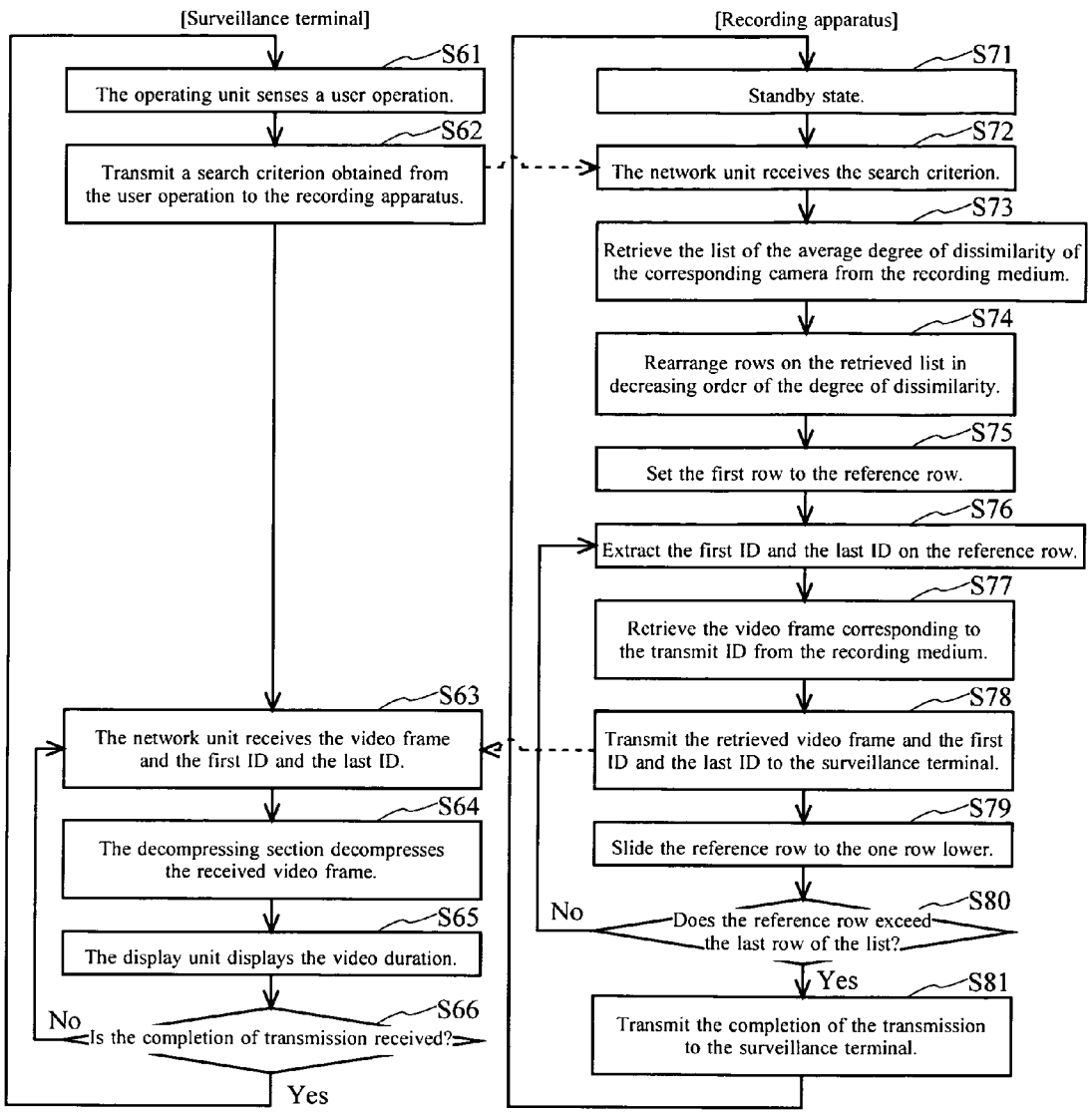
FIG. 12 is a diagram showing an example of the flow of processing in the recording apparatus and the surveillance terminal for performing an amount-of-displacement search on recorded images according to an embodiment of the invention.

FIG. 12 shows an example of the flow of processing in the recording apparatus 201 and the surveillance terminal 203 for performing the amount-of-displacement search on recorded images.

In a case where a user performs an operation on the surveillance terminal 203 for performing the amount-of-displacement search, the operating unit 234 senses the operation detail (step S61) and transmits a search criterion obtained from the operation detail to the recording apparatus 201 through the network unit 231 (step S62).

Here, in this embodiment, the search criterion may include the camera number currently being selected and/or the range of search times.

The recording apparatus 201 at standby state (step S71) receives the search criterion through the network unit 211 (step S72) and retrieves the list of the average degree of dissimilarity of the corresponding camera from the recording medium through the average degree-of-dissimilarity recording section 219 (step S73). The information pieces (refer to FIG. 8) on the rows of the retrieved list are rearranged in decreasing order of the degree of dissimilarity (step S74), and the first row of the rearranged list is set to the reference row (step S75).

Next, the first ID and the last ID on the reference row are extracted (step S76). The video frame corresponding to the first ID is retrieved from the recording medium through the video recording unit 213 (step S77), and the retrieved video frame and the first ID and the last ID are transmitted to the surveillance terminal 203 through the network unit 211 (step S78). Then, the reference row is moved to the one lower row (step S79).

The recording apparatus 201 repeats the processing in steps S76 to S79 until the reference row exceeds the last row. If the reference row exceeds the last row (step S80), the notification of the completion of the transmission is transmitted to the surveillance terminal 203 through the network unit 211 (step S81).

The surveillance terminal 203 receives the video frame and the first ID and the last ID transmitted from the recording apparatus 201 by the processing in step S78 through the network unit 231 (step S63). Then, the surveillance terminal 203 decompresses the received video frame by the decompressing section 232 (step S64) and displays a list of the resulting video durations on the display unit 233 (step S65).

Here, the front face of each of the video durations on the displayed list has display of a reduced image decompressed by the processing in step S64. The thickness of the cube expressing the length of each of the video durations 262 to 265 as shown in FIG. 10 is obtained based on the difference between the first ID and the last ID.

The routine (processing in steps S63 to S65) is continuously performed until the notification of the completion of the transmission from the recording apparatus 201 is received (step S66).

Those routines in both of the recording apparatus 201 and the surveillance terminal 203 are performed according to the instructions from the control sections 220 and 235 of the apparatus 201 and 203 or by the control sections 220 and 235.

Having described that the video frame to be retrieved in the processing in step S77 is based on the first ID according to this embodiment, the video frame based on the last ID or a meddle ID (the ID positioned at the middle between the beginning and the end) may be used in another configuration example.

In another configuration example, a part of the routine in steps S74 to S79 to be performed by the recording apparatus 201 in this embodiment may be implemented to perform by the surveillance terminal 203. For example, the list of average degrees of dissimilarity may be transmitted from the recording apparatus 201 to the surveillance terminal 203. The surveillance terminal 203 side may perform the processing in steps S74 to S76 and request the recording apparatus 201 side the video frame with the obtained first ID.

Next, the function of outputting a statistical report will be described.

Figure 13:
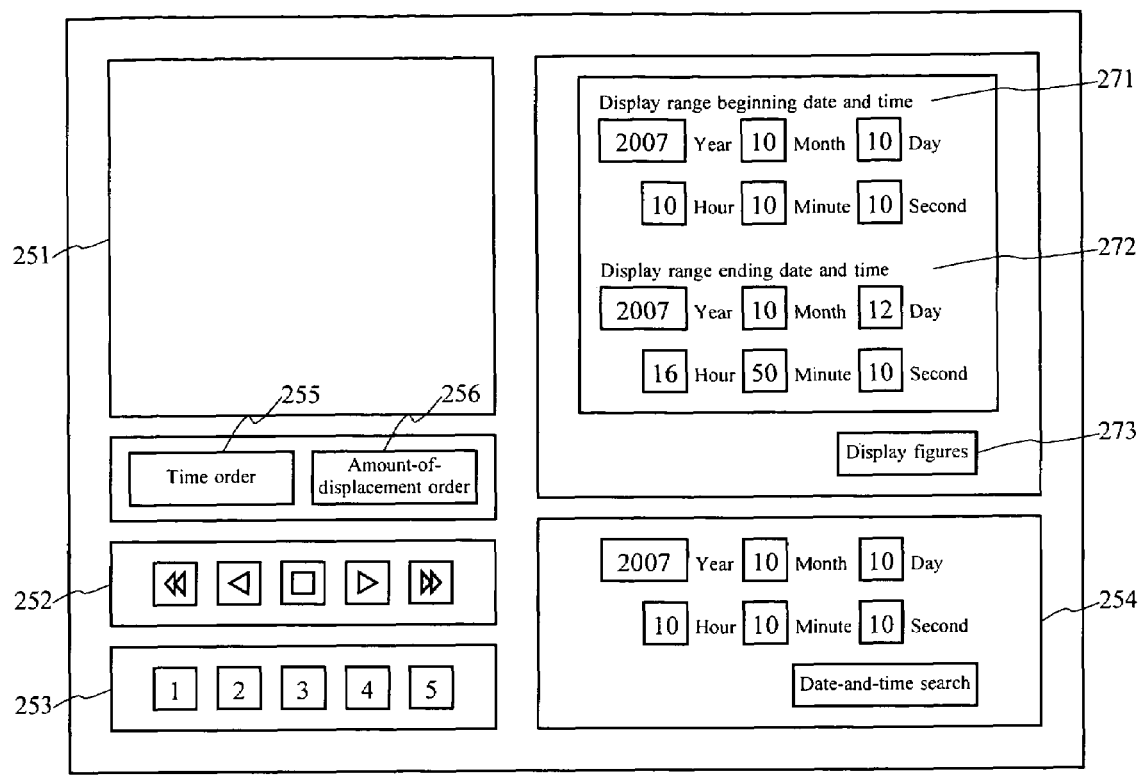
FIG. 13 is a diagram showing an example of the operation screen of the function of outputting a statistical report according to an embodiment of the invention.

FIG. 13 shows an example of contents (the operation screen) displayed on the display unit 233 of the surveillance terminal 203.

Display range specification fields 271 and 272 allow input (or selection) of the time range subject to display. The oldest time (first date and time) of the time range to be specified is entered on the display range specification field 271, and the latest time (last date and time) of the time range to be specified is entered on the display range specification field 272.

A figure display execution button 273 if pressed displays in a graph form the relationship between the amount of displacement and a time series of recorded images of the camera selected by the camera switching button group 253 in the time range entered on the display range specification fields 271 and 272. In this embodiment, this function is called statistical report output function.

Figure 14:
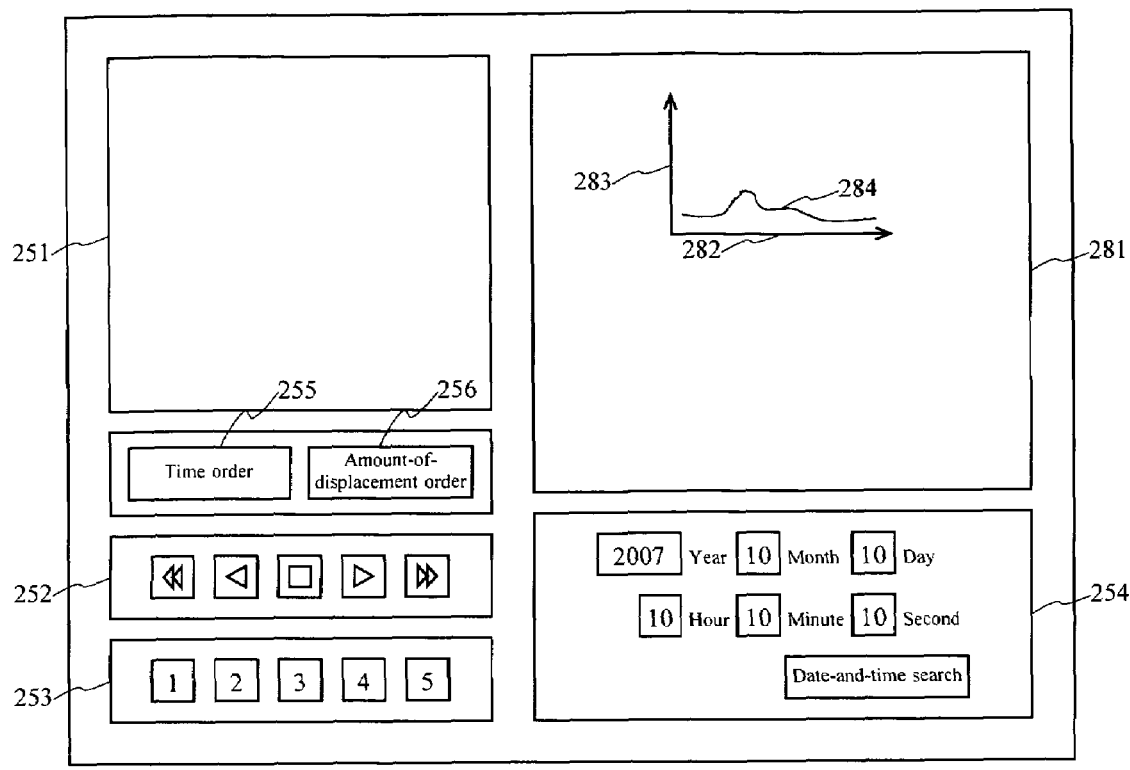
FIG. 14 is a diagram showing an example of the operation screen displayed as a result of the press of a statistical display execution button according to an embodiment of the invention.

FIG. 14 shows an example of the operation screen displayed as a result of the press of the figure display execution button 273.

A statistical report display field 281 displays a statistical report in a graph form.

More specifically, a time series axis 282, an amount-of-displacement axis 283 and a graph line 284 are displayed.

The time series axis 282 indicates the time (first date and time) given on the display range specification field 271 at the left end and indicates the time (last date and time) given on the display range specification field 272 at the right end. The amount-of-displacement axis 283 indicates that the amount of displacement increases as the distance from the origin increases. The graph line 284 is a line continuously illustrating the amounts of displacement in the time series manner.

Figure 15:
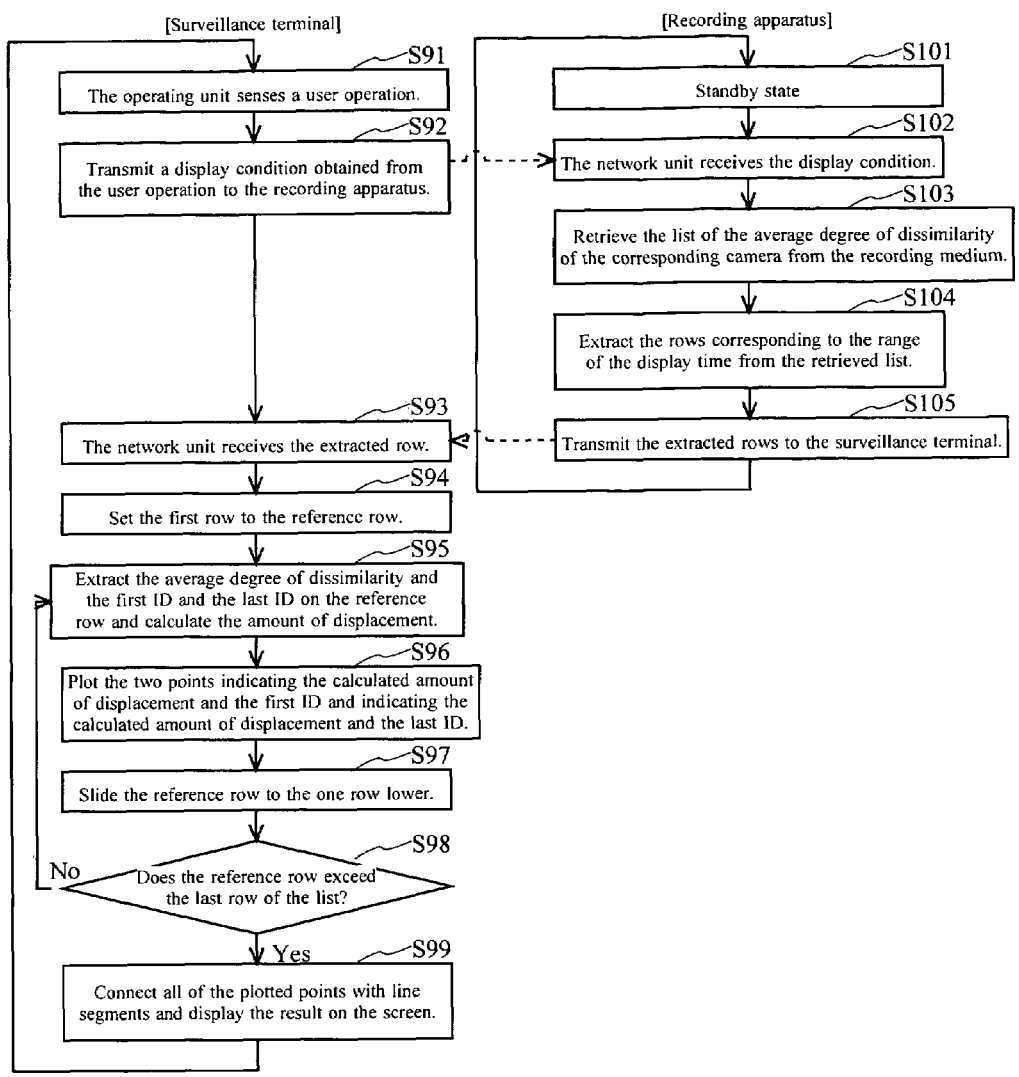
FIG. 15 is a diagram showing an example of the flow of processing in the recording apparatus and the surveillance terminal for performing the statistical report output on recorded images according to an embodiment of the invention.
Figure 16:
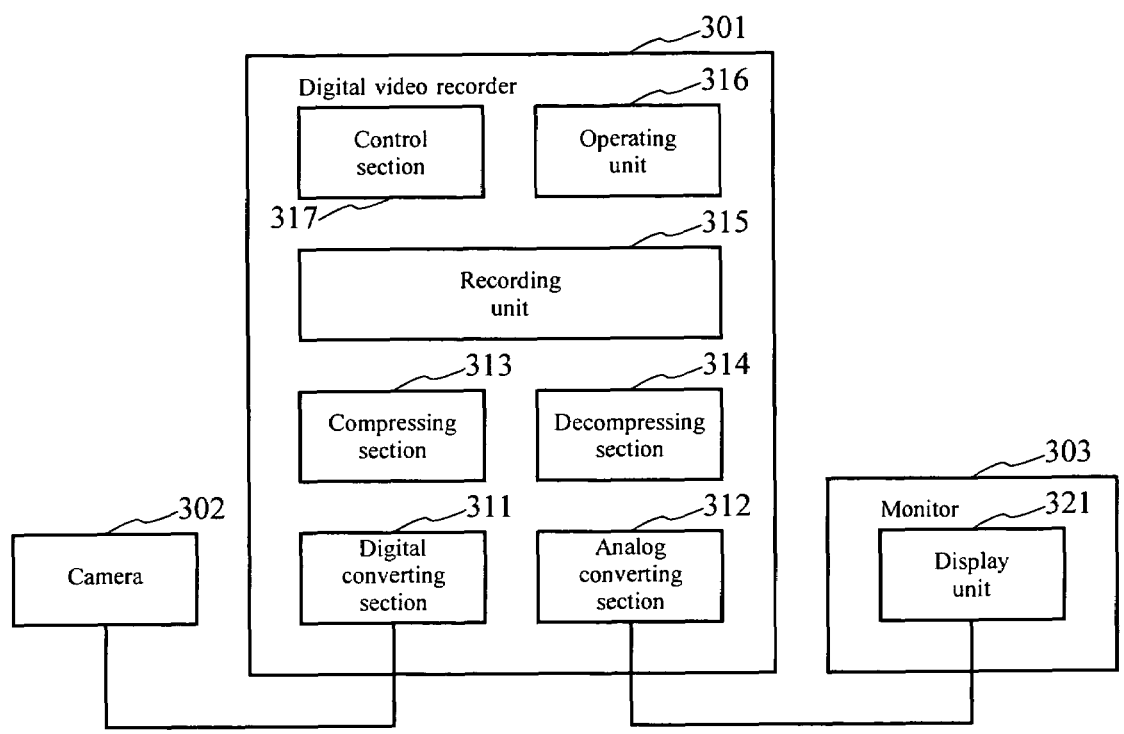
FIG. 16 is a diagram showing an example of the video surveillance system including a recording apparatus having an HDD as a recording medium.
Figure 17:
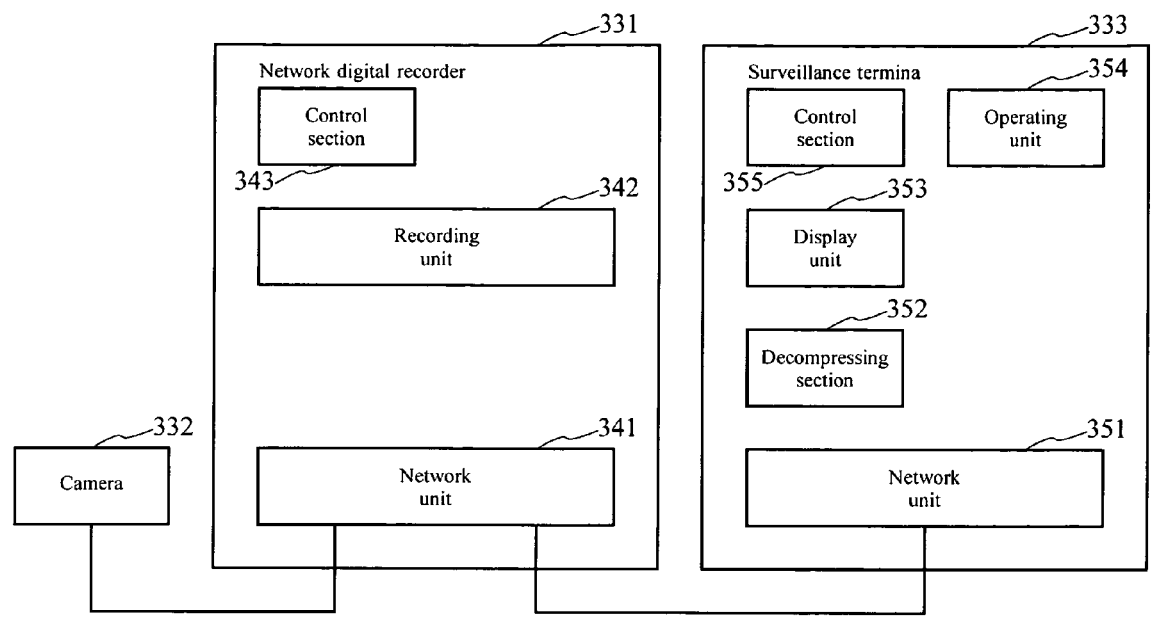
FIG. 17 is a diagram showing another example of the video surveillance system including a recording apparatus having an HDD as a recording medium.
Figure 18:
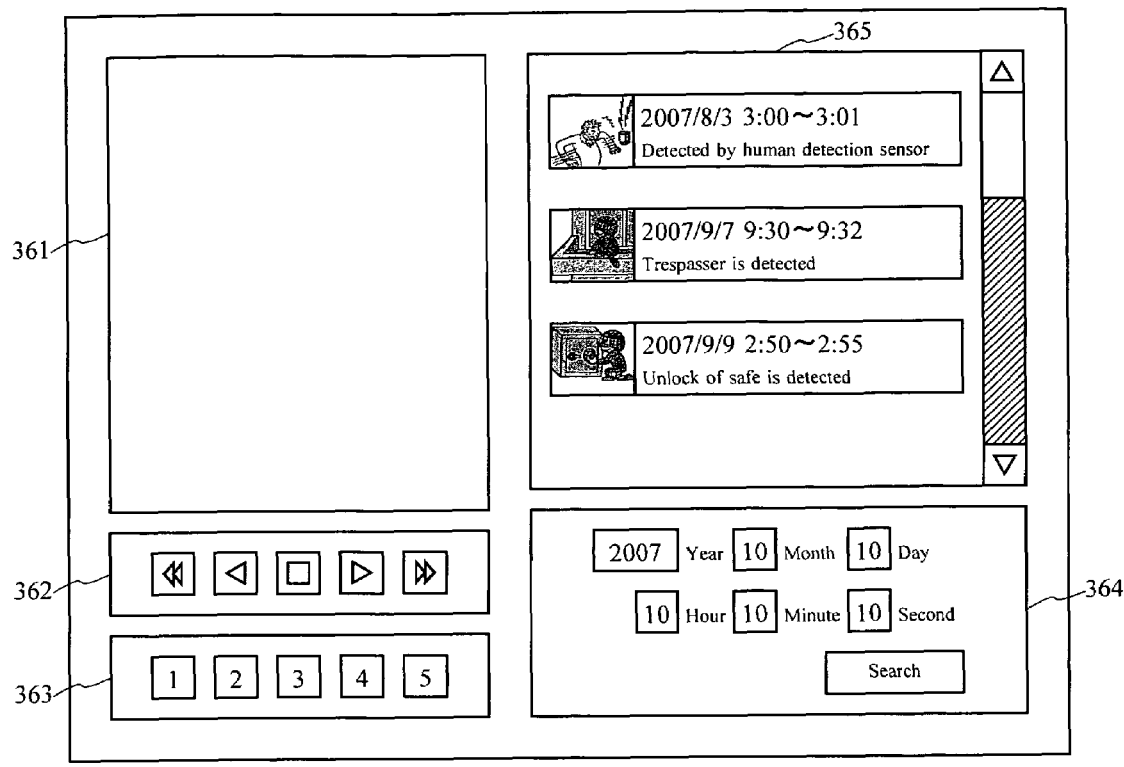
FIG. 18 is a diagram showing an example of the operation screen in a case where the recording apparatus having an HDD as a recording medium is used as a recording medium.

FIG. 15 shows an example of the flow of processing in the recording apparatus 201 and the surveillance terminal 203 for performing the statistical report output regarding recorded images.

In a case where a user performs an operation on the surveillance terminal 203 for executing the statistical report display, the operating unit 234 senses the operation detail (step S91) and transmits a display condition obtained from the operation detail to the recording apparatus 201 through the network unit 231 (step S92).

Here, in this embodiment, the display condition is the camera number being currently selected and the range of the display time.

The recording apparatus 201 at standby state (step S101) receives the display condition through the network unit 211 (step S102) and retrieves the list of the average degree of dissimilarity of the corresponding camera from the recording medium through the average degree-of-dissimilarity recording section 219 (step S103). The information pieces (refer to FIG. 8) on the rows corresponding to the range of the display time are extracted (step S104), and the information pieces on the extracted rows are transmitted to the surveillance terminal 203 through the network unit 211 (step S105).

The surveillance terminal 203 receives the information pieces on the extracted rows, which are transmitted from the recording apparatus 201, through the network unit 231 (step S93) and sets the first row of the extracted rows to the reference row (step S94).

Next, the average degree of dissimilarity and the first ID and the last ID on the reference row are extracted, and the amount of displacement is calculated from the average degree of dissimilarity (step S95). The point indicating the calculated amount of displacement and the first ID and the point indicating the calculated amount of displacement and the last ID are plotted (step S96). The reference row is moved by one until the reference row exceeds the last row on the second and subsequent rows (step S97), and the same processing is repeated thereon.

The routine (steps S95 to S97) is continuously performed until the extracted row transmitted from the recording apparatus 201 reaches the last row. After the last row (step S98), all of the plotted points are connected with line segments. Then, the result is displayed on the screen (step S99).

Those routines in both of the recording apparatus 201 and the surveillance terminal 203 are performed according to the instructions from the control sections 220 and 235 of the apparatus 201 and 203 or by the control sections 220 and 235.

The use of the function of outputting a statistical report allows a user to grasp the entire tendency of images in the specified time range before playing and viewing the images and can further reduce the load during the playback.

Having described the case where a report is displayed whenever necessary based on a user operation on the screen according to this embodiment, the automatic creation and/or display of a report may be performed periodically according to another configuration example.

The form of output is not limited to that on the operation screen in the surveillance terminal 203 or on the operation screen in the recording apparatus 201, but the display on the screen of the destination apparatus of the transmission of the output by e-mail or a printed form may be possible, for example.

As described above, the video playback method of this embodiment includes processing of determining the order of display of images based on the amounts of displacement from steady images in the video surveillance system including the video imaging apparatus (camera in this embodiment) 202, the video recording apparatus (the recording apparatus in this embodiment) 201 and the surveillance terminal 203.

The video playback method of this embodiment includes processing of determining the length of a video duration based on the change in amount of displacement where the display unit is a video duration.

The video recording method of this embodiment includes processing of obtaining the average feature amount of steady images, processing of obtaining the feature amount of an image under surveillance, processing of obtaining an amount of displacement of the feature amounts of them (which is the opposite indicator of the degree of similarity where the use of the degree of similarity may virtually provide the same effect), processing of determining the length of a video duration based on the change in amount of displacement, processing of obtaining the average amount of displacement (the average degree of dissimilarity in this embodiment) in the video duration and processing of recording the obtained average amount of displacement and the image under surveillance in relation with each other.

The video search method of this embodiment includes processing of displaying a list of video durations according to the amounts of displacement from a steady image.

The video viewing method of this embodiment includes processing of displaying in a graph form the amount of displacement of a surveillance image from a steady image (refer to FIG. 14).

In the video surveillance system that monitors by using images imaged by a video imaging apparatus according to this embodiment as described above, amounts of displacement of recorded images from a steady image are obtained, and an image having a larger amount of displacement can be displayed or played on a priority basis.

Thus, according to this embodiment, the time requiring the concentration of a viewer can be localized in the length of the playback time for the entire recorded images, which can reduce the load of surveillance.

This embodiment is the configuration example that each of all video frames definitely belongs to one of video durations.

Also, having described the configuration in which the feature amounts of all video frames are calculated according to this embodiment, the feature amounts of partial video frames may not be calculated, and the partial video frames may be included in the same video duration as that of the previous video frame or in the same video duration as that of the subsequent video frame under a preset rule according to another configuration example.

Having described that the average degree of dissimilarity is calculated before recording and is recorded for each video duration as on the table 241 according to this embodiment, the table 241, for example, may be created when the playback in order of amounts of displacement is required. Not only the degrees of dissimilarity are recorded as on the table 241, for example, but also the average value (vector) of the difference itself between the average feature amount vector and an input feature amount vector, which are used for calculating the degrees of dissimilarity may be recorded.

According to this embodiment, the component of the feature amount vector may include a part of the RGB histogram and/or intensity gradient distribution in each area resulting from the division of an entire image by a predetermined size. However, instead of such a purely statistical value, the coefficient of wavelet transformation or a distribution of a motion vector detected by an optical flow method can be used.

Since the spatial feature amount, which is the amount with no conception of time, is used for calculating the degree of dissimilarity according to this embodiment, this embodiment is also applicable to low frame rate images or time-lapse images for which the detection of the motion vectors is difficult. Since the feature amount vector with a compressed data amount is used instead of raw image data, the feature amount vectors of steady images can be cached, which can reduce the memory access and increase the speed more than those of the object detection (movement detection) based on a difference method requiring raw image data. Particularly, the decompression (S14) and the feature amount extraction (S15) may be more desirably processed simultaneously and in parallel. Multiple steady images can be switched easily for each preset position for the pan and tilt of a camera.

Second Embodiment

This embodiment describes another detail example of the initial operation in the above-described video processing apparatus.

In step 201, one or multiple sets of a steady image and multiple assumed abnormal images from which an abnormality (which is a difference from the steady image) should be detected near the steady image is or are prepared.

In step 202, a difference in feature amount vector between the steady image and the assumed abnormal images is obtained in each of the sets. The feature amount vector here is a statistical value calculated evenly from the entire area of an image and contains, as components, all of the RGB histograms and intensity gradient distributions in the areas resulting from the division of an image by a predetermined size. The number of components may be as high as about 1000.

In step 203, the components of the feature amount vector with low correlations in each set are selected in decreasing order. The correlation can be estimated as being high when the areas are spatially close and the size of the feature amount components in the areas are close.

In step 204, the components selected in the sets are added up in corresponding components, and the weight of the component is determined based on the absolute value of each of the added components. The components not selected in step 203 and the components having a smaller weight than a predetermined value are not used, and the number of components to be adopted for the subsequent calculation of the degree of dissimilarity is narrowed to several tens.

What is claimed is:

1. A video surveillance method that processes an image using a video processing apparatus, the images being imaged by a fixed camera and the video surveillance method comprising:

obtaining a feature amount vector from an entire image of a frame obtained by the camera in a steady state wherein the frame does not contain any abnormality to be watched;

obtaining feature amount vectors from respective video frames imaged by the camera;

obtaining degrees of dissimilarity between the feature amount vector in the steady state and the feature amount vectors of the video frames respectively;

determining variable lengths of video durations including multiple video frames by delimiting a video based on changes in the degrees of dissimilarity of the video frames;

obtaining, for each video duration, an average of the degrees of dissimilarity of the video frames included in the video duration as a degree of dissimilarity of the video duration;

recording the degrees of dissimilarity of the video durations and images of the video durations correspondingly on a recording means;

rearranging and displaying, using the video surveillance apparatus, the video durations in decreasing order of dissimilarity; and receiving a playback condition for playback in an amount-of-displacement forward playback mode, wherein all components of the feature amount vector are only spatial feature amounts not based on time so as to be applicable to low frame rate images or time-lapse images, the spatial feature including a color histogram or an intensity gradient in each area divided from the entire image by a predetermined size, the feature amount of the steady state is obtained by averaging among multiple video frames included in the vide duration at the steady state, and the degrees of dissimilarity D(X,Y) are obtained by an equation;

$$D(X,Y) = \Sigma wi |xi - yi|^2$$

wherein xi and yi are components of the feature amount of the vectors of the video frames and the feature amount of the vector in the steady state respectively and wi are weights for respective components, the video durations of a plurality of video frames are displayed in decreasing order of the degree of dissimilarity or in temporal order depending on selection of a playback mode, obtaining of the average of degrees of dissimilarity adds a degree of dissimilarity and an ID to a table every time a degree of dissimilarity exceeds a threshold value, the table being configured to include a list of degrees of dissimilarity and IDs, recording the degrees of dissimilarity, based on the playback condition, accesses the table to retrieve the list of average degrees of dissimilarity and IDs of a corresponding camera and rearranges the list of average degrees of dissimilarity in decreasing order of the degree of dissimilarity with a first row of the rearranged list set to a reference row, and obtaining the feature amount extracts a first ID and the last ID on the reference row, and a value of the first ID is set to an ID of a video frame to be transmitted by the video surveillance method and wherein when the retrieved video frame is transmitted, a transmit ID is incremented.

2. The video surveillance method according to claim 1, wherein the feature amount vector in the steady state is obtained by calculating an average of feature amount vectors extracted from respective frames in the video duration at the steady state and the degrees of dissimilarity are obtained from several of the components of the feature amount vectors including both of a color histogram and an intensity gradient.

3. The video surveillance method according to claim 2, wherein the video durations are delimited at a position where a difference between a historical average value of the degree of dissimilarity from a previous delimiting position and the degree of dissimilarity of a current frame exceeds a predetermined threshold value.

4. The video surveillance method according to claim 2, further comprising:
preparing one or more sets of a steady image and abnormal images;
obtaining a difference in a feature amount vector between the steady image and the abnormal images in each of the sets, the feature amount vector consisting only of the spatial feature amount calculated evenly from an entire area of an image and containing components in areas resulting from the division of an image by a predetermined size;
selecting the components of the feature amount vector with low correlations in each set in decreasing order; and
adding up corresponding components selected in the sets and determining each of the weights of the components based on an absolute value of the selected components,
wherein components not selected in the selecting step are not used for obtaining the degrees of dissimilarity D(X, Y).

5. A video recording apparatus for video surveillance that processes images, the images being imaged by fixed cameras and the video recording apparatus comprising:
a feature amount extractor that obtains a feature amount vector from an entire image of a frame obtained by the camera in a steady state wherein the frame does not contain any abnormality to be watched, and obtains feature amount vectors from respective video frames which are imaged by the camera;
a degree-of-dissimilarity calculator that obtains degrees of dissimilarity between the feature amount vector in the steady state and the feature amount vectors of the video frames respectively, and determines variable lengths of video durations including multiple video frames by delimiting a video based on changes in the degrees of dissimilarity of the video frames;
an average degree-of-dissimilarity calculator that obtains, for each video duration, an average of the degrees of dissimilarity of the video frames included in the video duration as a degree of dissimilarity of the video duration;
an average degree-of-dissimilarity recorder that records the degrees of dissimilarity of the video durations and images of the video durations correspondingly on a recording means; and
a display unit configured to rearrange and display the video durations in decreasing order of dissimilarity, and
a network unit that receives a a playback condition for playback in an amount-of-displacement forward playback mode,
wherein all components of the feature amount vector are only spatial feature amounts not based on time so as to be applicable to low frame rate images or time-lapse images, the spatial feature including a color histogram or an intensity gradient in each area divided from the entire image by a predetermined size,
the feature amount of the steady state is obtained by averaging among multiple video frames included in the video duration at the steady state, and
the degrees of dissimilarity D(X,Y) are obtained by an equation:

$$D(X,Y)=wi|xi-yi|^2$$

wherein xi and yi are components of the feature amount of the vectors of the video frames and the feature amount of the vector in the steady state respectively and wi are weights for respective components, and
the video durations of a plurality of video frames are displayed in decreasing order of the degree of dissimilarity or in temporal order depending on selection of a playback mode,
the average degree-of-dissimilarity calculator adds a degree of dissimilarity and an ID to a table every time a degree of dissimilarity exceeds a threshold value, the table being configured to include a list of degrees of dissimilarity and IDs,
the average degree-of-dissimilarity recorder, based on the playback condition, accesses the table to retrieve the list of average degrees of dissimilarity and IDs of a corresponding camera and rearranges the list of average degrees of dissimilarity in decreasing order of the degree of dissimilarity with a first row of the rearranged list set to a reference row,
the feature amount extractor extracts a first ID and the last ID on the reference row, and a value of the first ID is set to an ID of a video frame to be transmitted by the video recording apparatus, and
wherein when the retrieved video frame is transmitted, a transmit ID is incremented.

6. The video recording apparatus according to claim 5, wherein the video recording apparatus performs a statistical report function for providing a statistical report regarding images that are imaged by a camera, the statistical report being provided in a graph form.

* * * * *